W. LEE.
SPLICE BAR.
APPLICATION FILED AUG. 4, 1919.
1,328,170.
Patented Jan. 13, 1920.
2 SHEETS—SHEET 1.
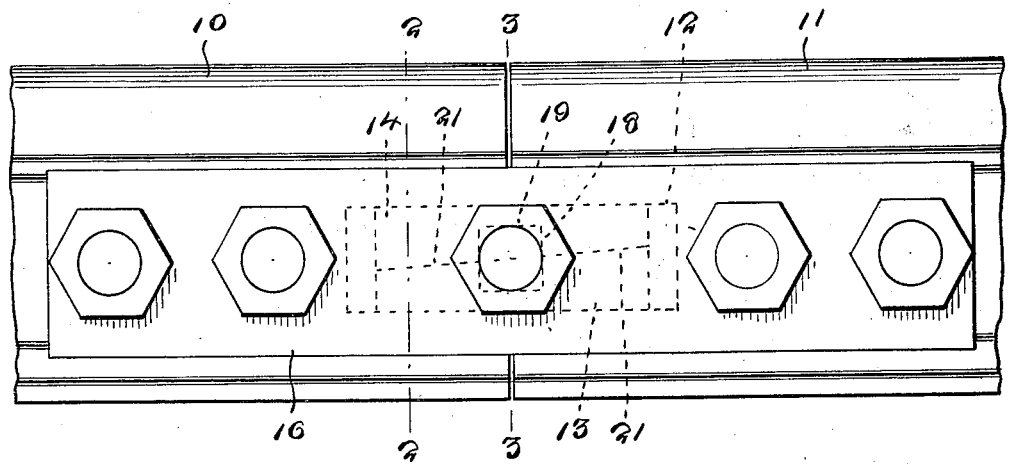
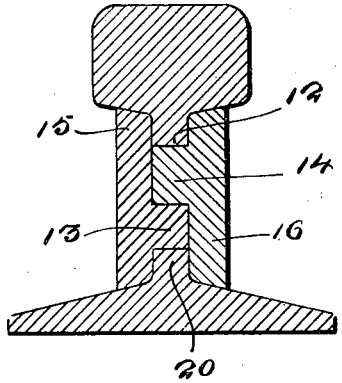
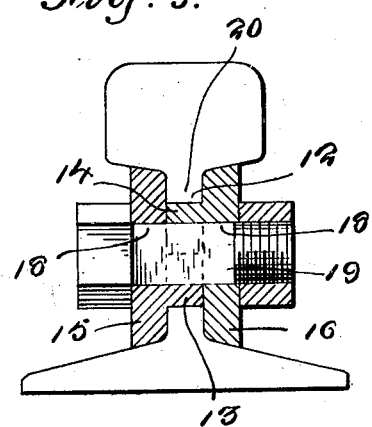
WITNESS:
E. R. Ruppert.
William Lee
INVENTOR.
BY
Victor J. Evans
ATTORNEY.

W. LEE.
SPLICE BAR.
APPLICATION FILED AUG. 4, 1919.
1,328,170.
Patented Jan. 13, 1920.
2 SHEETS—SHEET 2.
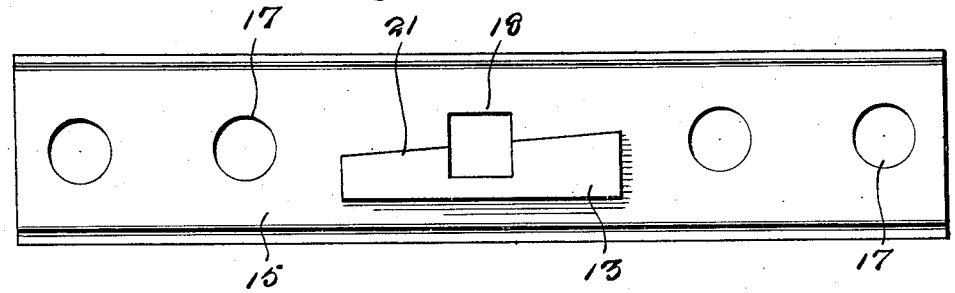
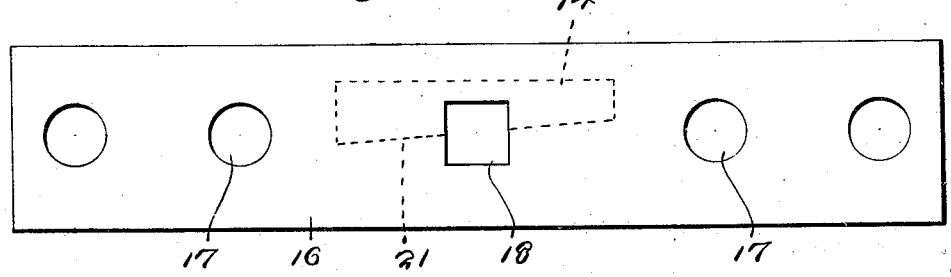
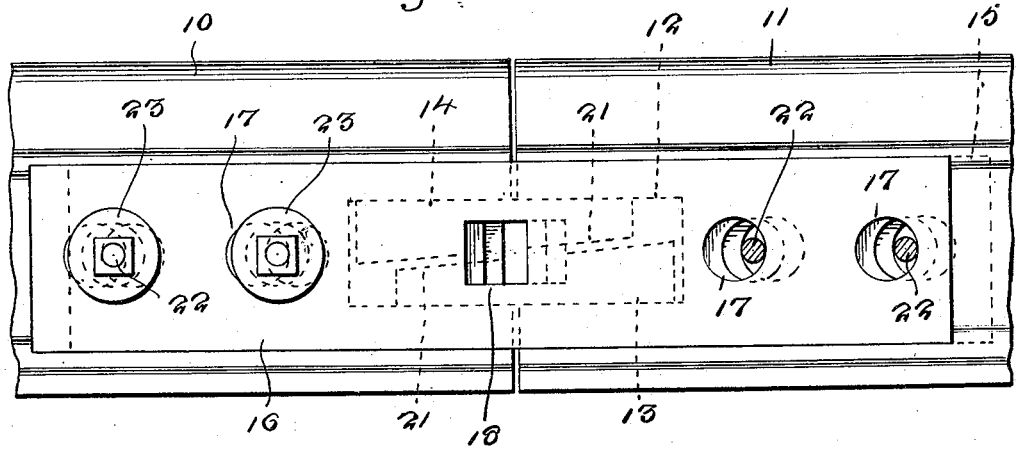
William Lee
INVENTOR.
WITNESS:
E. R. Ruppert.
BY
Victor J. Evans
ATTORNEY.

UNITED STATES PATENT OFFICE.

WILLIAM LEE, OF NEW BEDFORD, MASSACHUSETTS.

SPLICE-BAR.

1,328,170.  Specification of Letters Patent.  Patented Jan. 13, 1920.

Application filed August 4, 1919. Serial No. 315,219.

*To all whom it may concern:*

Be it known that I, WILLIAM LEE, a subject of the King of Great Britain, residing at New Bedford, in the county of Bristol and State of Massachusetts, have invented new and useful Improvements in Splice-Bars, of which the following is a specification.

The object of the invention is to provide a simple and effective splice bar for railway rails, designed when in place to support the joints formed by the meeting ends of the rails in such a way as to avoid the necessity, if otherwise undesirable, of placing a tie thereunder, and serving to hold the same in such relation that vibration due to the passage of a train will cause joint movement thereof to the same extent.

To this end the invention consists in the construction, combination and arrangement of parts hereinafter specifically set forth in connection with the description of a preferred embodiment, it being understood that changes in the form and proportion may be resorted to, within the scope of the appended claims, without departing from the principles involved.

In the drawings:—

Figure 1 is a side view of the adjacent ends of two rails connected by splice bars constructed in accordance with the invention and showing in dotted lines the jack wedge element carried respectively by the members of the splice bar.

Fig. 2 is a transverse sectional view of the same on the plane indicated by the line 2—2 of Fig. 1.

Fig. 3 is a similar sectional view on the plane indicated by line 3—3 of Fig. 1.

Figs. 4 and 5 are respectively inside and outside views of the two splice bar members disconnected.

Fig. 6 is a view similar to Fig. 1 showing the relation of the parts before the members of the jack wedge are brought into their proper coöperative relation, and indicating the bolt openings of the splice bar members held engaged by temporary bolts of less diameter than the permanent bolts which are introduced subsequent to the proper adjustment of said members.

The end rails 10 and 11 are provided with slots 12 formed by cutting away portions of the rail webs for the reception of jack wedge elements 13 and 14 carried respectively by and which may be formed integral respectively with the splice bar members 15 and 16 having the usual bolt openings 17 for registration with corresponding openings in the rail webs.

Also preferably at or about the center of the inwardly extending tapered enlargements forming the jack wedge elements 13 and 14 said splice bar members are provided with registering openings 18 which are preferably square for the reception of a transverse bolt 19 having a cross sectionally square body portion or shank to fit snugly therein. The extent of projection of the jack wedge elements from the planes of the inner surfaces of the splice bar members is equal to the thickness of the rail web indicated at 20, so that when the splice bar members are arranged in contact with the opposite surfaces of the rail webs, with the jack wedge elements in a plane common with each other and with said rail web, and with their bevel faces 21 in contact, said elements substantially occupy the space represented by the slots in the rail webs, and the splice bar members may then be forced by sledges or otherwise, in opposite directions to spread the same so as to bring the exterior faces of the jack wedge elements into firm engagement with the upper and lower walls of the slots in rail webs and obviously into such coöperative relation with each so far as their bevel faces are concerned as to afford a rigid connection between the rail ends, and until the angular or squared openings 18 are in proper registration.

During the driving of the splice bars to their proper positions relative to each other and to the rail ends, and subsequent to the placing of said splice bar members respectively in contact with opposite faces of the rail webs, the bolt openings 17 of the said members may be connected through the webs of the rail ends, by means of temporary bolts, 22, shown in Fig. 6, with washers 23 covering the bolt openings, so that while the splice bar members are thus free to move endwise in order to secure the proper relation of the wedge elements, they are held from dropping laterally out of position. Obviously after the members of the splice bar have been brought to their proper positions, and the required clamping and wedging action upon the rail ends has been effected, the angular openings 18 then being in alinement, the transverse anchor bolt 19 may be seated and secured, after which the temporary bolts 22 may be withdrawn and the proper permanent bolts substituted and secured in the ordinary way.

What I claim is:—

1. Splice bars for railway rails provided upon their inner faces with beveled spaced overlapping jack wedge elements and means for locking said elements in their adjusted relation.

2. Splice bars provided at their inner faces with wedge shaped jack wedge elements disposed in overlapping relation in the plane of the rail web, and means intersecting said elements for securing the splice bar members in their adjusted relation.

3. Splice bars provided at their inner faces with overlapping jack wedge elements disposed in a common plane with bevel faces in contacting relation and intersected by a cross sectionally angular opening formed mutually in the elements of the jack wedge, and a cross sectionally angular anchor bolt engaging said openings.

4. The combination with rail terminals arranged in alinement and provided in their webs with registering slots, of splice bar members arranged in contact with the opposite side surfaces of the rail webs and provided at their inner sides with overlapping jack wedge elements disposed in a common plane with the webs, within the slots thereof, and having beveled faces for contacting relation, and means for anchoring said splice bar members against movement longitudinally and transversely.

In testimony whereof I affix my signature.

WILLIAM LEE.